(12) United States Patent
Smith et al.

(10) Patent No.: US 6,766,094 B2
(45) Date of Patent: Jul. 20, 2004

(54) AERIAL CLOSURE FOR LOCAL CONVERGENCE POINT

(75) Inventors: Kelly J. Smith, Willow Park, TX (US); Donnie R. Clapp, Jr., Saginaw, TX (US)

(73) Assignee: Corning Cable Systems LLC, Hickory, NC (US)

( * ) Notice: Subject to any disclaimer, the term of this patent is extended or adjusted under 35 U.S.C. 154(b) by 39 days.

(21) Appl. No.: 10/184,209

(22) Filed: Jun. 28, 2002

(65) Prior Publication Data

US 2004/0001686 A1 Jan. 1, 2004

(51) Int. Cl.$^7$ ................................................ G02B 6/00
(52) U.S. Cl. ...................................................... 385/135
(58) Field of Search ................................. 385/134–136

(56) References Cited

U.S. PATENT DOCUMENTS

| | | | |
|---|---|---|---|
| 5,479,553 A | | 12/1995 | Daems et al. ................ 385/135 |
| 5,495,549 A | | 2/1996 | Schneider et al. .......... 385/135 |
| 5,511,144 A | * | 4/1996 | Hawkins et al. ............ 385/135 |
| 5,692,299 A | | 12/1997 | Daems et al. ................. 29/869 |
| 5,701,380 A | * | 12/1997 | Larson et al. ............... 385/134 |
| 5,717,810 A | * | 2/1998 | Wheeler ...................... 385/135 |
| 5,790,739 A | * | 8/1998 | Strause ........................ 385/135 |
| 6,160,946 A | * | 12/2000 | Thompson et al. ......... 385/134 |
| 6,226,434 B1 | * | 5/2001 | Koshiyama et al. ........ 385/134 |
| 6,275,639 B1 | | 8/2001 | Bolt et al. ................... 385/135 |
| 6,275,640 B1 | | 8/2001 | Hunsinger et al. .......... 385/135 |
| 6,539,160 B2 | * | 3/2003 | Battey et al. ............... 385/135 |
| 6,542,688 B1 | * | 4/2003 | Battey et al. ............... 385/135 |

* cited by examiner

*Primary Examiner*—Edward J. Glick
*Assistant Examiner*—Thomas R Artman
(74) *Attorney, Agent, or Firm*—Christopher C. Dremann (57) ABSTRACT

A closure interconnects at least one optical fiber of a feeder cable with two or more optical fibers of a distribution cable at a local convergence point in an optical network. The base of the closure defines a fiber storage and fiber management area adjacent one of the end caps and a fiber coupling area adjacent the other end cap. The fiber coupling area includes one or more coupler modules for splitting an optical signal carried on the optical fiber of the feeder cable into different optical signals carried on the two or more optical fibers of the distribution cable. The optical fiber of the feeder cable is spliced to an input optical fiber of a connectorized pigtail and then split into two or more output optical fibers of connectorized pigtails. The output optical fibers of the pigtails are then spliced to optical fibers of the distribution cable.

22 Claims, 8 Drawing Sheets

AERIAL CLOSURE FOR LOCAL CONVERGENCE POINT

FIELD OF THE INVENTION

The present invention relates generally to enclosures for interconnecting at least one optical fiber of a feeder cable with two or more optical fibers of a distribution cable. More particularly, the invention relates to a closure comprising a plurality of coupler modules for splitting an optical signal carried by an optical fiber of a feeder cable into different optical signals carried on two or more optical fibers of a distribution cable at a local convergence point in an optical network.

BACKGROUND OF THE INVENTION

Telecommunications service providers are currently developing networks consisting entirely of fiber optic components to meet the demand for high bandwidth communications service to businesses and homes. These "all-optical" telecommunications networks require a line of service enclosures, referred to herein as "closures," along the network that are located at access points in the field. Each such location is referred to herein as a "local convergence point." A closure is utilized at a local convergence point to interconnect optical fibers of a feeder cable from a service provider with optical fibers of one or more distribution cables. In some instances, optical fibers of the feeder cable are connected to optical fibers of drop cables that are routed directly to the business or home of a subscriber of the communications service. In other instances, optical fibers of the feeder cable are connected to optical fibers of a cable that is routed from the closure to yet another local convergence point along the optical network to serve as a further feeder cable for additional drop cables. The further feeder cable is sometimes referred to in the art as a "branch" cable. The optical network may be configured in many different ways, but typically, is configured with a plurality of feeder cables from the service provider having optical fibers that are interconnected with optical fibers of distribution cables at various local convergence points. The distribution cables serve as drop cables routed directly to communications equipment belonging to subscribers, or as branch cables routed to other local convergence points. As used herein, the term "distribution cable" includes both drop cables and branch cables, as those terms are presently understood by one skilled in the art. Furthermore, the term "optical fiber" or "optical fibers" as used herein includes coated and uncoated (i.e., bare) single fibers, jacketed fibers (e.g., tight-buffered and loose buffered), multiple fibers, multiple fiber ribbons, and fiber optic cables containing one or more optical fibers.

While fiber optic networks have traditionally served as the back bone or trunk line of telecommunication networks to transmit signals over relatively long distances, all-optical networks are gradually being extended closer to the end points of the network. In this regard, fiber optic networks are being developed that deliver fiber-to-the-home, fiber-to-the-business, fiber-to-the-desk, and the like. In each of these applications, the closure must be capable of interconnecting optical fibers of the feeder cables with optical fibers of the distribution cable to establish the desired optical connections. In existing optical networks, the optical fibers of the feeder cable are typically interconnected with the optical fibers of the distribution cable within a splice closure that is buried underground, mounted in an above-ground pedestal, mounted on a telephone pole, or suspended from an aerial telephone cable strand. In the case of an underground (also referred to as below grade) splice closure, the closure typically includes a frame defining a longitudinal axis that is enclosed by a cylindrical or dome-shaped cover. In the case of a splice closure mounted on a telephone pole or suspended from an aerial telephone cable strand (also referred to as an "aerial closure"), the closure typically includes a base defining a longitudinal axis and a cover movably attached to the base. The cover is intended to protect the optical fiber connections from adverse environmental conditions, while at the same time optimize the number of connections that can be made within the closure. In a splice closure, however, the optical fibers of the feeder cable are spliced in a one-to-one relationship with the optical fibers of the distribution cable. Thus, the number of optical connections that can be made within the splice closure, commonly referred to in the art as the "fiber capacity" of the closure, is limited by the number of one-to-one splices that can be accomplished within the volume constraints of the closure. As the all-optical network proliferates, it is anticipated that the number of optical connections required to be made within the closure will soon exceed the fiber capacity of conventional splice closures.

It is further anticipated that demand will require the number of optical fibers of the feeder cable to increase dramatically as the all-optical network proliferates. Since many feeder cables are already installed in fiber optic cable ducts that are buried underground, and because there is oftentimes a physical or functional limit to the number of optical fibers that can be contained together within a feeder cable, there will soon be too few optical fibers from service providers to meet the increased demand for high bandwidth communications service to businesses and homes. It will therefore be necessary, for example, for service providers to install additional feeder cables within existing fiber optic cable ducts or to invest in the construction of additional fiber optic cable ducts to carry the additional feeder cables. In either case, substantial capital expense will have to be incurred by the service provider, and ultimately, passed on to the subscriber in the form of higher cost communications service.

As the all-optical network proliferates, there will certainly be an increased need for a field technician to reconfigure the optical connections within the splice closure. Although spliced optical connections can be reconfigured, it is time consuming for the field technician to identify the appropriate optical fibers of the feeder cable and the distribution cable. Furthermore, it generally requires the expertise of a highly trained field technician to reconfigure a conventional splice closure at an access point in the field. As a result, it is costly for a service provider to frequently dispatch a skilled field technician to reconfigure the optical connections within a conventional splice closure. Once again, the additional expense incurred by the service provider to reconfigure the splice closure will ultimately be passed on to the subscriber in the form of higher cost communications service. Accordingly, there is a need for a closure that resolves the aforementioned difficulties associated with the proliferation of an all-optical telecommunications network. The present invention solves these, as well as other, problems by providing a closure for interconnecting at least one optical fiber of a feeder cable with two or more optical fibers of a distribution cable at a local convergence point in an optical network. The closure permits the optical connections to be made in a space efficient, organized and timely manner that does not require a highly skilled field technician to reconfigure the optical connections within the closure.

BRIEF DESCRIPTION OF THE DRAWINGS

The present invention will be described in conjunction with the accompanying drawings in which like reference numerals represent the same or similar parts in the different views. The drawings, which are incorporated in and constitute a part of this specification, provide further understanding of the invention, illustrate various embodiments of the invention, and, together with the description, help to fully explain the principles and objectives thereof. More specifically.

DETAILED DESCRIPTION OF THE INVENTION

The invention is described more fully hereinafter with reference to the accompanying drawings, in which various embodiments of the invention are shown. The invention may, however, be embodied in many different forms, and therefore, should not be construed as being limited to the embodiments described and shown herein. Illustrative embodiments are set forth herein so that this description will be thorough and complete, and will fully convey the intended scope of the claimed invention while enabling those skilled in the art to make and practice the invention without undue experimentation.

Referring now to FIGS. 1–6, a closure, indicated generally at 10, constructed in accordance with one embodiment of the invention is shown. The closure 10 permits an optical fiber of a feeder cable 12 to be interconnected with two or more optical fibers of at least one distribution cable 16 at a local convergence point in an optical network. As used herein, the term "local convergence point" refers to a location along the optical network that provides a field technician with access to the optical connections between the feeder cable 12 and the distribution cable 16. A typical optical network is constructed with a line of closures 10 along the network that interconnect optical fibers of the feeder cable 12 with optical fibers of drop cables that provide telecommunications services to homes and businesses, or with optical fibers of branch cables leading to other closures 10 along the network. The closure 10 may be buried below ground or disposed in a larger enclosure, such as an above ground pedestal. However, the closure 10 shown and described herein is preferably installed in an aerial location, for example mounted on a telephone pole or hung from an aerial cable strand, and thus, is commonly referred to as an "aerial" closure. Regardless, the closure 10 provides a convenient access point in the optical network for a field technician to initially install and subsequently reconfigure the optical fiber connections between the feeder cable 12 and the distribution cable 16. Although the closure 10 illustrated in the figures is an "in-line" closure, it may have other configurations, such as a canister, or "butt" type closure, or may be a distribution terminal, without departing from the intended spirit or scope of the invention.

As is well known and understood in the art, the feeder cable 12 may be a main feeder cable from the service provider, or may be a branch cable from a distribution terminal or another closure 10 along the optical network. The feeder cable 12 comprises at least one, and preferably, a plurality of flexible buffer tubes 13 (FIGS. 2–5) each containing at least one, and preferably a plurality, of optical fibers connected to communications transmission equipment from the service provider. The distribution cable 16 comprises at least one, and preferably a plurality of flexible buffer tubes 17 (FIG. 5). The distribution cable 16 may comprise buffer tubes 17 for one or more drop cables, each containing at least one optical fiber connected to communications equipment at a subscriber's premises, such as a home or business. The distribution cable 16 may also comprise buffer tubes 17 for one or more branch cables, each containing at least one optical fiber connected, for example, to another closure 10 along the optical network. The buffer tubes 13 of the feeder cable 12 and the buffer tubes 17 of the distribution cable 16 may contain any type, or types, of optical fibers, such as tight-buffered optical fibers, loose-buffered optical fibers, and ribbon fiber. As such, the term "optical fiber" or "optical fibers" as used herein is intended to include all types of optical transmitting fibers, including individual coated optical fibers, individual uncoated (i.e., bare) optical fibers, tight-buffered optical fibers, loose-buffered optical fibers, optical fibers in the form of a multi-fiber ribbon, or any other known expedient of a light transmitting fiber medium. Additionally, the optical fibers may have various diameters, including for example diameters of 900 micron, 2 mm and 3 mm.

Figure 1:
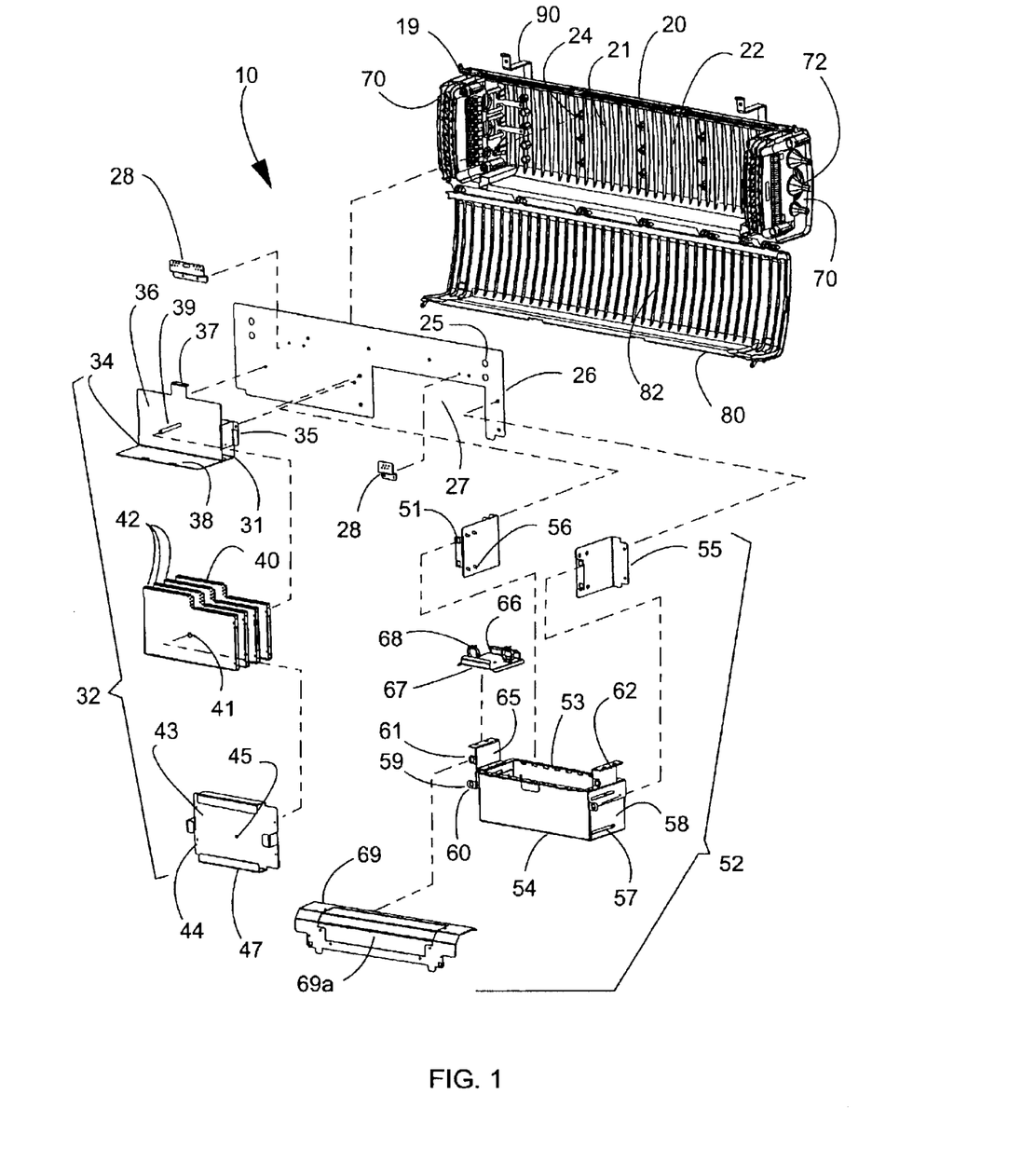
FIG. 1 is an exploded perspective view of a closure constructed in accordance with the invention for use at a local convergence point in an optical network.

FIG. 1 is an exploded perspective view showing the various components of the closure 10. As best shown in FIG. 1, the closure 10 comprises a base 20 having opposed ends, a pair of end caps 70 attached to the opposed ends of the base 20, and a cover 80 movably attached to the base 20. The cover 80 is adapted to fit over the base 20 and end caps 70 to protect the optical fiber connections within the closure 10 from adverse environmental effects, such as dirt, dust, and insect and rodent infestation, and to provide a relatively water-tight seal with the base 20 and end caps 70. As shown herein, the cover 80 is hingedly attached to the base 20 for movement between an opened configuration and a closed configuration. Preferably, the base 20 and/or the cover 80 comprise conventional fasteners, locking mechanisms, or other means 19 for securing the cover 80 to the base 20 in the closed configuration. In an alternative embodiment, the over 80 may be secured on the base 20 by one or more straps comprising "hook and loop" (i.e., VELCRO) type fasteners. The closure 10 may optionally comprise one or more hangars 90, preferably affixed to base 20, for mounting the closure 10 on a telephone pole or an aerial cable strand in a known manner. The base 20, end caps 70 and cover 80 are made of a lightweight, yet structurally rigid material, such as plastic or composite (e.g., fiber and resin material), and preferably, are made of a thermoplastic material, such as polypropylene or polyethylene. However, any relatively lightweight, substantially rigid, flame and fire-resistant, non-porous, and preferably electrically and thermally insulative material is suitable. The remaining structural components of the closure 10 described hereinafter are made of a lightweight, yet rigid metal, such as aluminum. Furthermore, the base 20 may comprise lengthwise and/or lateral (as shown) ribs 22 to strengthen and/or stiffen the base 20 of the closure 10 in a desired direction. The cover 80 may likewise comprise lengthwise and/or lateral (as shown) ribs 82 to strengthen and/or stiffen the cover 80 of the closure 10 in a desired direction.

The end caps 70 may be attached to the base 20 in any conventional manner that permits the feeder cable 12 and the distribution cable 16 to be unsheathed (i.e., a portion of the outer jacket cut and removed) and adequately strain relieved to the end cap 70 or the base 20. Each end cap 70 is somewhat disc-shaped and is preferably formed in a one piece that defines a plurality of openings therethrough, referred to herein as cable ports 72 (FIGS. 1 and 6), for receiving fiber optic cables. As shown, each end cap 70 has a plurality of cable ports 72 configured to receive the feeder cable 12 and at least one distribution cable 16 therethrough. Typically, one of the cable ports 72 will receive the feeder cable 12 and another of the cable ports 72 will receive the distribution cable 16. However, any of the remaining cable ports 72 may receive an additional feeder cable 12, such as in what is commonly referred to in the art as a "taut-sheath, mid-span application," or an additional distribution cable 16 comprising one or more drop cables or branch cables. For example, the cable ports 72 may receive a main feeder cable 12 from the service provider, one or more drop cables leading to a subscriber's premises, such as a home or business, and one or more branch cables leading to another closure 10 along the optical network. The cable ports 72 comprise means (not shown) for creating a relatively fluid-tight seal between the end cap 70 and the feeder cable 12 and between the end cap 70 and each distribution cable 16. The periphery of the end cap 70 is adapted to be received between the interior surface of the base 20 and the interior surface of the cover 80, and may be provided with a gasket or other sealing means (not shown). Furthermore, the unused cable ports 72 are typically closed off so that the base 20, end caps 70, and cover 80 define a relatively water-tight enclosure for the optical fiber connections between the feeder cable 12 and the distribution cable 16 housed within the closure 10. The specific configuration of the base 20, the end caps 70, and the cover 80 is shown for purposes of illustration only, and is not intended to limit the scope of the invention in any way. The design and functionality of the base 20, the end caps 70, and the cover 80 are known and form no part of the present invention.

The base 20 is generally elongate and defines a lengthwise direction and a lateral direction. The end caps 70 are positioned within the open ends of the base 20 and the cover 80 is positioned over the end caps 70 and the base 20 to define an interior compartment 21 (FIG. 1 and FIG. 6) for receiving fiber storage, fiber management, and fiber coupling components therein. The base 20 is provided with a plurality of mounting posts 24 for securing the fiber storage, fiber management, and fiber coupling components within the interior compartment 21 of the closure 10. As shown and described herein, the base 20 defines a fiber storage and fiber management area 30 (FIGS. 2–5) adjacent the end cap 70 receiving the incoming feeder cable 12 and the outgoing distribution cable 16 (i.e., the left-hand end of the base 20 as shown in FIGS. 1–6). The base 20 further defines a fiber coupling area 50 (FIGS. 2–5) adjacent the other end cap 70 (i.e., the right-hand end of the base 20 as shown in FIGS. 1–6). The fiber storage and fiber management area 30 is preferably located nearer the incoming feeder cable 12 and the outgoing distribution cable 16 so as to shorten the lengths of the optical fibers that must be routed within the closure 10. Accordingly, it is less likely that an unprotected optical fiber will be inadvertently bent beyond the allowable limit (e.g., the minimum bend radius) or will be crushed between the base 20 and the cover 80 when the cover 80 is moved relative to the base 20 from the opened configuration to the closed configuration. As such, the closure 10 shown and described herein, and in particular the base 20, is partitioned into a first area 30 for mounting the fiber storage and fiber management components onto the base 20 and a second area 50 for mounting the fiber coupling components onto the base 20 of the closure 10. As shown, the mounting posts 24 are arranged in generally parallel rows of two or more openings spaced along the length of the base 20 and extending in the lateral direction. As a result, the mounting posts 24 define a generally planar mounting surface within the interior compartment 21 of the closure 10. The base 20, however, may be provided with any convenient number of mounting posts 24 and the mounting posts 24 may be arranged in any suitable configuration. For example, one or more of the mounting posts 24 may be deleted, or additional supporting structure may be provided for mounting the fiber storage, fiber management, and fiber coupling components within the interior compartment 21 of the closure 10.

A back plate 26 is secured to two or more of the mounting posts 24 with conventional fasteners or the like. As shown, the back plate 26 is generally planar and has a plurality of openings 25 formed therethrough that receive conventional fasteners or the like to secure the back plate 26 to the base 20 and to secure certain of the fiber storage, fiber management, and fiber coupling components to the back plate 26, as will be described. The openings 25 may be through holes or may be internally threaded to accommodate a desired type of fastener. In a particularly advantageous embodiment, the mounting posts 24 and the openings 25 receive "push pin" type quick release fasteners so that the base 20, the back plate 26, and the fiber storage, fiber management, and fiber coupling components secured to the back plate 26 may be quickly and easily connected without the use of tools. As shown and described herein, the back plate 26 has a relatively large opening, or cutout, 27 (FIGS. 1 and 6) formed therethrough along the lower edge adjacent one end of the back plate 26. The back plate 26 is secured within the interior compartment 21 of the closure 10 such that the cutout 27 is positioned in the fiber coupling area 50 defined by the base 20 to receive the fiber coupling components. Thus, the cutout 27 of the back plate 26 is positioned adjacent the end cap 70 that does not receive the incoming feeder cable 12 and the outgoing distribution cable 16. One or more buffer tube support brackets 28 may be secured to the back plate 26 to support buffer tubes being routed within the interior compartment 21 of the closure 10. For example, the support brackets 28 may support one or more buffer tubes 13 of the feeder cable 12 that are being routed through the closure 10 in the aforementioned tautsheath, mid-span application. The support brackets 28 are preferably provided with a plurality of through holes for receiving cable ties, wraps, or the like that contain and secure the buffer tubes 13 to the support brackets 28. As shown, a single support bracket 28 is provided in the fiber storage and fiber management area 30 and a single support bracket 28 is provided in the fiber coupling area 50. However, any number of support brackets 28 may be provided at one or more convenient locations on the back plate 26, as desired.

Figure 6:
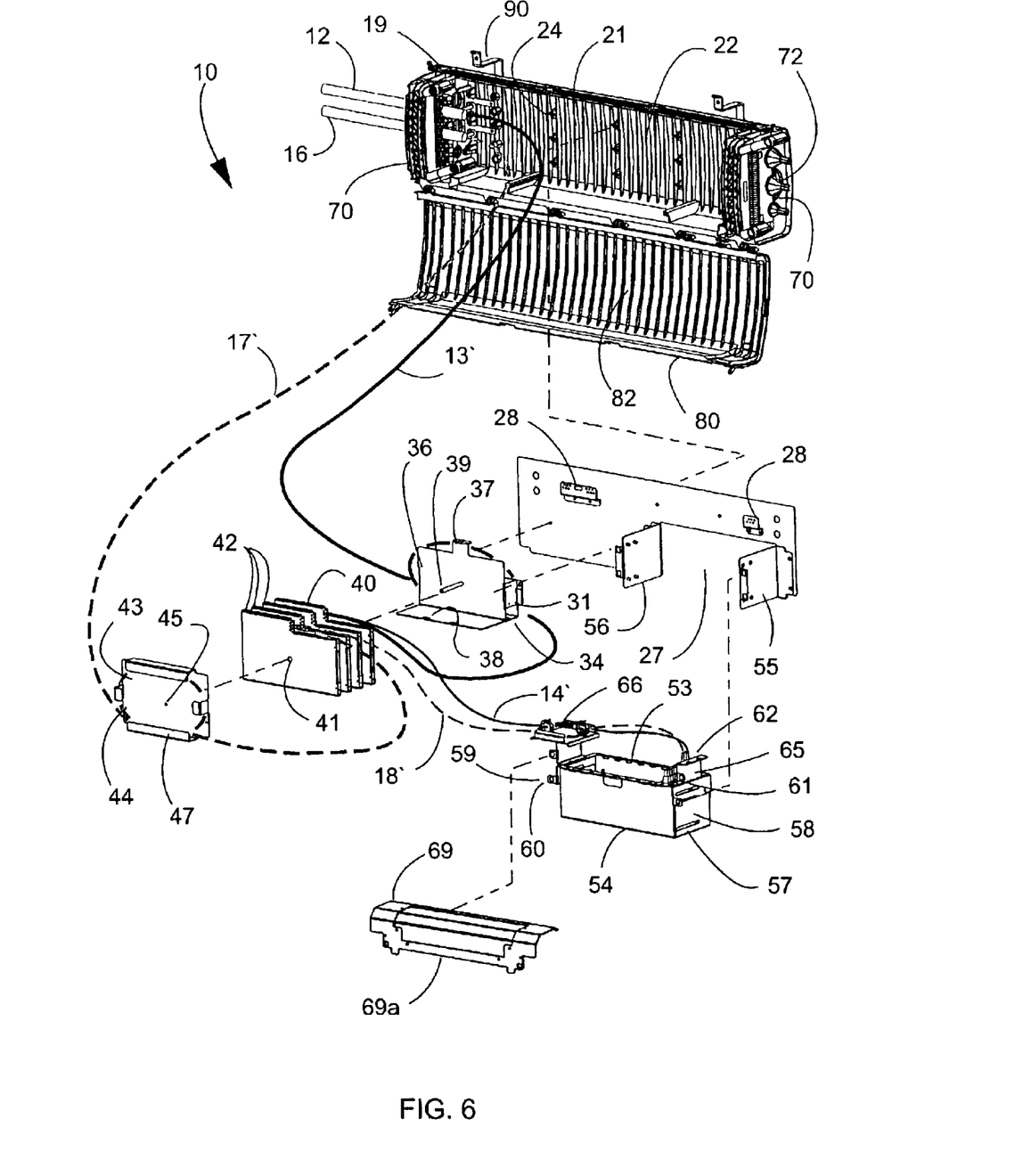
FIG. 6 is an exploded perspective view of the closure of FIG. 1 illustrating the interconnection of a typical optical fiber from the feeder cable with a typical optical fiber of the distribution cable.

The fiber storage and fiber management area 30 houses a slack basket and splice tray assembly 32 that is secured to the back plate 26 with suitable fasteners that engage certain of the openings 25 provided on the back plate 26. In particular, the slack basket and splice tray assembly 32 comprises a feeder fiber slack storage basket 34 having one or more brackets 35 for securing the slack storage basket 34 to the back plate 26. The slack storage basket 34 defines a cavity 31 (as best shown in FIGS. 1 and 6) for retaining a slack length of fiber optic cable or optical fiber. In particular, the slack storage basket 34 retains a plurality of slack lengths of the buffer tubes 13 of the feeder cable 12 between the outer surface of the back plate 26 and the inner surface of a vertical dividing wall 36. The feeder cable 12 is passed through one of the cable ports 72 of the nearest end cap 70 and is strain relieved to the base 20 or the end cap 70 in a known manner, for example by one or more cable ties. A portion of the outer sheath of the feeder cable 12 is removed to expose a suitable length of the buffer tubes 13. The buffer tubes 13 are routed into the fiber storage and fiber management area 30 in any expedient manner that does not exceed the minimum bend radius of the optical fibers within the buffer tubes 13. The unused buffer tubes 13 of the feeder cable 12 are terminated within the closure 10, or are routed from the fiber storage and fiber management area 30 out of the closure 10. Preferably, the unused buffer tubes 13 are routed out of the closure 10 through the sheathed downstream portion of the feeder cable 12, or through a separate branch cable. Although not shown, the downstream portion of the feeder cable 12 and/or the branch cable exits the closure 10 through one of the other cable ports 72 of the end cap 70. The slack storage basket 34 preferably comprises at least one flange 37 extending outwardly from the dividing wall 36 for retaining the coils of slack lengths of buffer tubes 13 within the cavity 31 between the outer surface of the back plate 26 and the inner surface of the dividing wall 36. Alternatively, the slack storage basket 34 may comprise one or more routing guides, clips, or cable ties to retain the coils of slack lengths of buffer tubes 13 within the cavity 31 defined by the slack storage basket 34. As shown, the slack storage basket 34 comprises a pair of brackets 35 that are perpendicular to the dividing wall 36 and a single flange 37 that is perpendicular to the dividing wall 36 and angled inwardly to retain the coils of slack lengths of buffer tubes 13 between the back plate 26 and the dividing wall 36.

The slack basket and splice tray assembly 32 further comprises one or more splice trays that are mounted outwardly from the dividing wall 36 of the slack storage basket 34. As shown, the slack storage basket 34 further comprises a horizontal mounting platform 38 and a mounting stud 39 for supporting the splice trays. Alternatively, the mounting platform 38 may be removed and the splice trays supported on the mounting stud 39, or the mounting stud 39 may be removed and the splice trays supported on the mounting platform 38. In either instance, the splice trays may be secured to the dividing wall 36 by a strap comprising "hook and loop" (i.e., VELCRO) type fasteners. In the embodiments shown and described herein, a single feeder fiber splice tray 40 and up to three distribution fiber splice trays 42, as needed, are supported on the mounting platform 38 and/or the mounting stud 39. As shown, each of the splice trays 40, 42 has a hole 41 (FIGS. 1 and 6) formed therethrough for receiving the mounting stud 39, if utilized. Preferably, the feeder fiber splice tray 40 is positioned nearest to dividing wall 36 (and therefore nearest the cavity 31 defined by the slack storage basket 34) so that the lengths of the buffer tubes 13 of the feeder cable 12 are minimized and the routing of the buffer tubes 13 from the cavity 31 to the splice tray 40 is simplified. Conversely, the distribution fiber splice trays 42 are positioned farthest from the dividing wall 36 for a purpose to be described hereinafter. As shown, the splice trays 40, 42 are narrower at one end. In particular, the splice trays 40, 42 are narrower adjacent the fiber coupling area 50. The narrower end of the splice trays 40, 42 facilitates the entry of optical fibers from the buffer tubes 13 of the feeder cable 12 and optical fibers from the buffer tubes 17 of the distribution cable 16 into the splice trays 40, 42. The narrower end of the splice trays 40, 42 likewise facilitates the exit of optical fibers from feeder fiber pigtails 14 and optical fibers from distribution fiber pigtails 18 out of splice trays 40, 42, as will be described hereinafter. As used herein, the term "pigtail" refers to an optical fiber, either bare or jacketed, that has an optical fiber connector on one end. As will be described hereinafter, pigtails 14 connect optical fibers from feeder fiber splice tray 40 to coupler modules 64, while pigtails 18 connect optical fibers from distribution fiber splice trays 42 to coupler modules 64. The splice trays 40, 42 are also somewhat smaller in size than conventional splice trays due to the limited amount of space available in the fiber storage and fiber management area 30 within the interior compartment 21 of the closure 10. Nevertheless, the splice trays 40, 42 are configured to accommodate up to 24 separate splices between optical fibers from the buffer tubes 13, 17 and optical fibers from the corresponding pigtails 14, 18.

The slack basket and splice tray assembly 32 further comprises a distribution fiber slack storage basket 44 positioned outwardly of the splice trays 40, 42. As shown, slack storage basket 44 has a hole 45 (FIGS. 1 and 6) formed therethrough for receiving mounting stud 39. The slack storage basket 44 may be secured through hole 45 onto the mounting stud 39 by a fastener, such as a threaded wing nut. Alternatively, the slack storage basket 44 may be secured with the splice trays 40, 42 to the dividing wall 36 by a strap comprising "hook and loop" (i.e., VELCRO) type fasteners. The slack storage basket 44 similarly defines a cavity 43 (FIGS. 1, 5 and 6) for retaining a slack length of fiber optic cable or optical fiber. In particular, the slack storage basket 44 retains a plurality of slack lengths of the buffer tubes 17 of the distribution cable 16. In yet another embodiment, the slack storage basket 44 may be movably attached to the mounting platform 38, for example by a hinge (not shown), so that the slack storage basket 44 may be rotated downwardly to provide access to the splice trays 40, 42. Accordingly, the splice trays 40, 42 may be removed and replaced without disturbing the buffer tubes 17 retained within the cavity 43 defined by the slack storage basket 44. The distribution cable 16 is passed through one of the cable ports 72 of the nearest end cap 70 and is strain relieved to the base 20 or the end cap 70 in a known manner, for example by one or more cable ties. A portion of the outer sheath of the distribution cable 16 is removed to expose a suitable length of the buffer tubes 17. As shown in FIG. 5, the buffer tubes 17 are routed into the fiber storage and fiber management area 30 to the slack storage basket 44 such that the slack lengths of buffer tubes 17 are retained within the cavity 43 defined by the slack storage basket 44. The buffer tubes 17 are routed into the fiber storage and fiber management area 30 in any expedient manner that does not exceed the minimum bend radius of the optical fibers within the buffer tubes 17. The unused buffer tubes 17 of the distribution cable 16 are terminated within the closure 10. The slack storage basket 44 preferably comprises at least one outwardly extending flange 47 for retaining coils of the slack lengths of buffer tubes 17 within the cavity 43 defined by the slack storage basket 44. Alternatively, the slack storage basket 44 may comprise one or more routing guides, clips, or cable ties to retain coils of the slack lengths of buffer tubes 17 within the cavity 43 defined by the slack storage basket 44. As shown, the slack storage basket 44 comprises a pair of flanges 47 that are perpendicular to the planar surface of the slack storage basket 44 in the lengthwise direction, and a pair of smaller flanges 47 that are perpendicular to the planar surface of the slack storage basket 44 in the lateral direction to retain the coils of slack lengths of buffer tubes 17 within the cavity 43 defined by the slack storage basket 44. Preferably, the distribution fiber splice trays 42 are positioned farthest from the dividing wall 36 (and therefore nearest the cavity 43 defined by the slack storage basket 44) so that the lengths of the buffer tubes 17 of the distribution cable 16 are minimized and the routing of the buffer tubes 17 from the slack storage basket 44 to the splice trays 42 is simplified.

The fiber coupling area 50 houses a coupler module assembly 52 that is secured to the back plate 26 with suitable fasteners that engage certain of the openings 25 provided on the back plate 26. In particular, the coupler module assembly 52 comprises a coupler module housing 54 and one or more brackets 55 for movably attaching the coupler module housing 54 to the back plate 26. The coupler module housing 54 defines an interior cavity 53 (FIGS. 1 and 6) for retaining a plurality of coupler modules 64 (FIGS. 2–5), as will be described. As shown, the coupler module housing 54 has one or more elongate slots 57 formed in each end wall 58, and each bracket 55 comprises one or more guide pins 56 that engages the slot 57. The coupler module housing 54 further comprises a flange 60 extending outwardly from each end wall 58 that has a hole 59 formed therethrough. The hole 59 receives a fastener, such as a conventional quarter-turn fastener, therethrough that engages a corresponding hole 51 provided on the bracket 55 to lock the coupler module housing 54 to the bracket 55 in a closed position. When the fastener releases the coupler module housing 54 from the bracket 55, the slot 57 of the coupler module housing 54 is slidable on the guide pins 56 so that the coupler module housing 54 is movable relative to the bracket 55 from the closed position to an opened position. In the opened position, the coupler modules 64 are accessible to make optical connections between the pigtails 14, 18 spliced to optical fibers from the buffer tubes 13, 17 of the feeder cable 12 and the distribution cable 16, respectively, and the coupler modules 64, as will be described. The slot 57 and guide pins 56 also prevent the coupler module housing 54 from being detached from the bracket 55 and removed from the fiber coupling area 50. If the coupler module housing 54 is inadvertently removed, the pigtails 14, 18 and/or the optical connections between the pigtails 14, 18 and the coupler modules 64 may be damaged. The coupler module housing 54 can be fixed to the brackets 55 or the back plate 26 to prevent possible damage to the pigtails 14, 18 and the optical connections. However, access to the optical connections, and particularly those connections located nearest to the back plate 26, would be significantly reduced.

The coupler module assembly 52 further comprises a pigtail slack storage basket 66 that is secured to the coupler module housing 54 by one or more brackets 65. Preferably, a bracket 65 is provided adjacent each end wall 58 of the coupler module housing 54 so that the pigtail slack storage basket 66 can be located at either lengthwise end of the coupler module housing 54, for a purpose which will become evident hereinafter. Each bracket 65 comprises an outwardly extending flange 62 that has one or more holes formed therethrough. The pigtail slack storage basket 66 has a corresponding hole formed therethrough for receiving a fastener to secure the pigtail slack storage basket 66 to the bracket 65. As shown, the pigtail slack storage basket 66 has a pair of lengthwise extending flanges 67 and a pair of guide rings 68 (FIG. 1) for retaining the pigtails 14, 18 within the pigtail slack storage basket 66. The coupler module assembly 52 further comprises a coupler module housing cover 69 for protecting the coupler modules 64 and the pigtails 14, 18 that are routed between the fiber storage and fiber management area 30 and the fiber coupling area 50. The coupler module housing cover 69 has one or more holes for receiving a fastener, such as a conventional quarter-turn fastener, therethrough that engages a corresponding hole 61 provided on the bracket 65 to lock the coupler module housing cover 69 to the bracket 65. Preferably, the coupler module housing cover 69 comprises a window 69a made of a transparent material, such as LEXAN, so that the optical connections between the pigtails 14, 18 and the coupler modules 64 can be observed without removing the coupler module housing cover 69.

Figure 2:
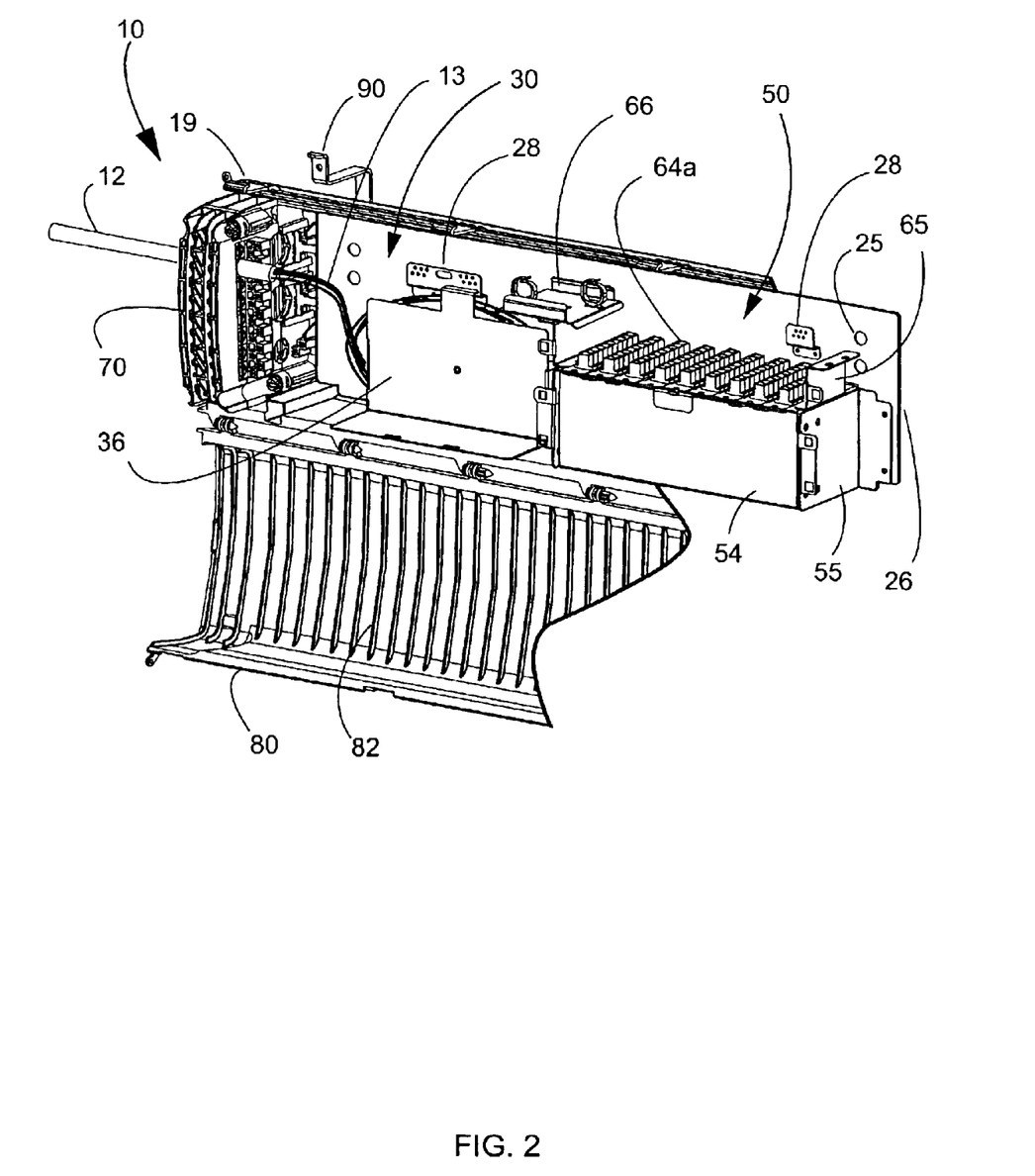
FIG. 2 is a perspective view of the interior compartment of the closure of FIG. 1 shown with the distribution fiber slack storage basket and the splice trays of the slack basket and splice tray assembly removed for purposes of clarity.

FIG. 2 is a perspective view of the interior compartment 21 of the closure 10 with the distribution fiber slack storage basket 44, the feeder fiber splice tray 40, and the distribution fiber splice trays 42 removed for purposes of clarity. As shown in FIG. 2, the buffer tubes 13 of the feeder cable 12 positioned in the end cap 70 are routed into the fiber storage and fiber management area 30. The buffer tubes 13 are routed to the cavity 31 defined by the feeder fiber slack storage basket 34 where coils of slack lengths of the buffer tubes 13 are retained between the back plate 26 and the dividing wall 36. As previously mentioned, unused buffer tubes 13 may be terminated in the cavity 31, or may be directed out of the closure 10 through the downstream feeder cable or a separate branch cable.

Figure 3:
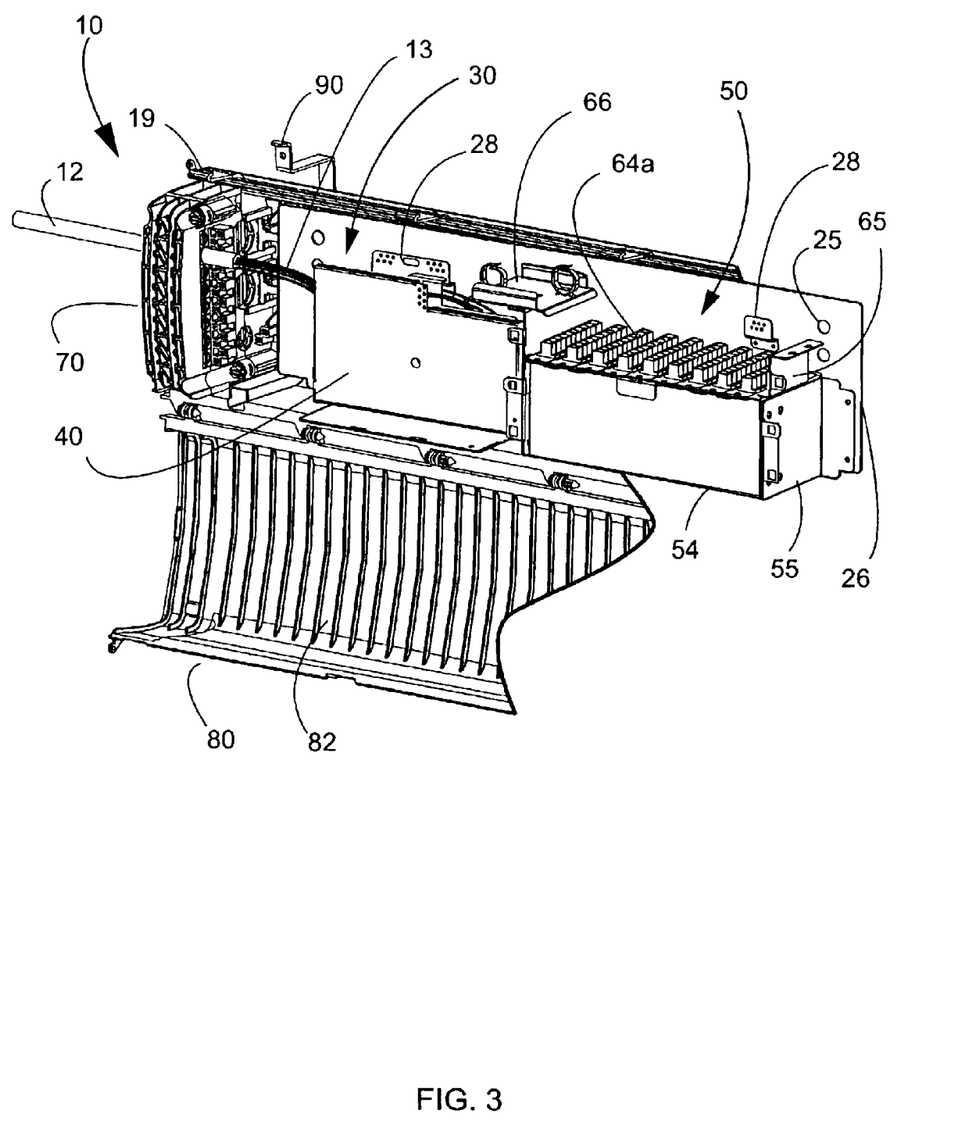
FIG. 3 is a perspective view of the interior compartment of the closure of FIG. 1 shown with the distribution fiber slack storage basket and the distribution fiber splice trays of the slack basket and splice tray assembly removed for purposes of clarity.

FIG. 3 is a perspective view of the interior compartment 21 of the closure 10 with the distribution fiber slack storage basket 44 and the distribution fiber splice trays 42 removed for purposes of clarity. As shown in FIG. 3, one of the buffer tubes 13 of the feeder cable 12 is routed from the cavity 31 defined by the slack storage basket 34 to the splice tray 40 where suitable lengths of the optical fibers from the buffer tube 13 are further routed into the splice tray 40.

Figure 4:
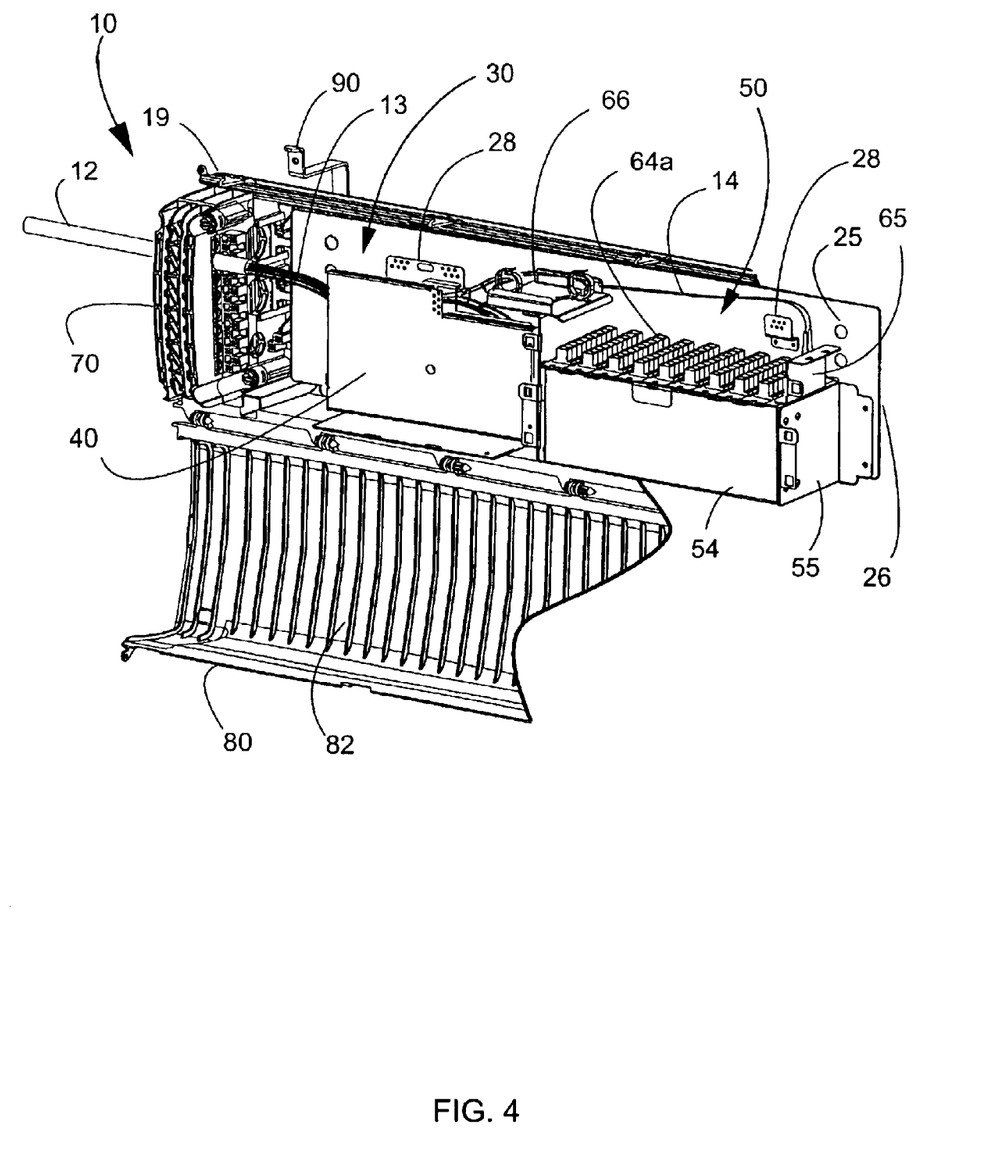
FIG. 4 is a perspective view of the interior compartment of the closure of FIG. 1 shown with the distribution fiber slack storage basket and the distribution fiber splice trays of the slack basket and splice tray assembly removed for purposes of clarity.
Figure 5:
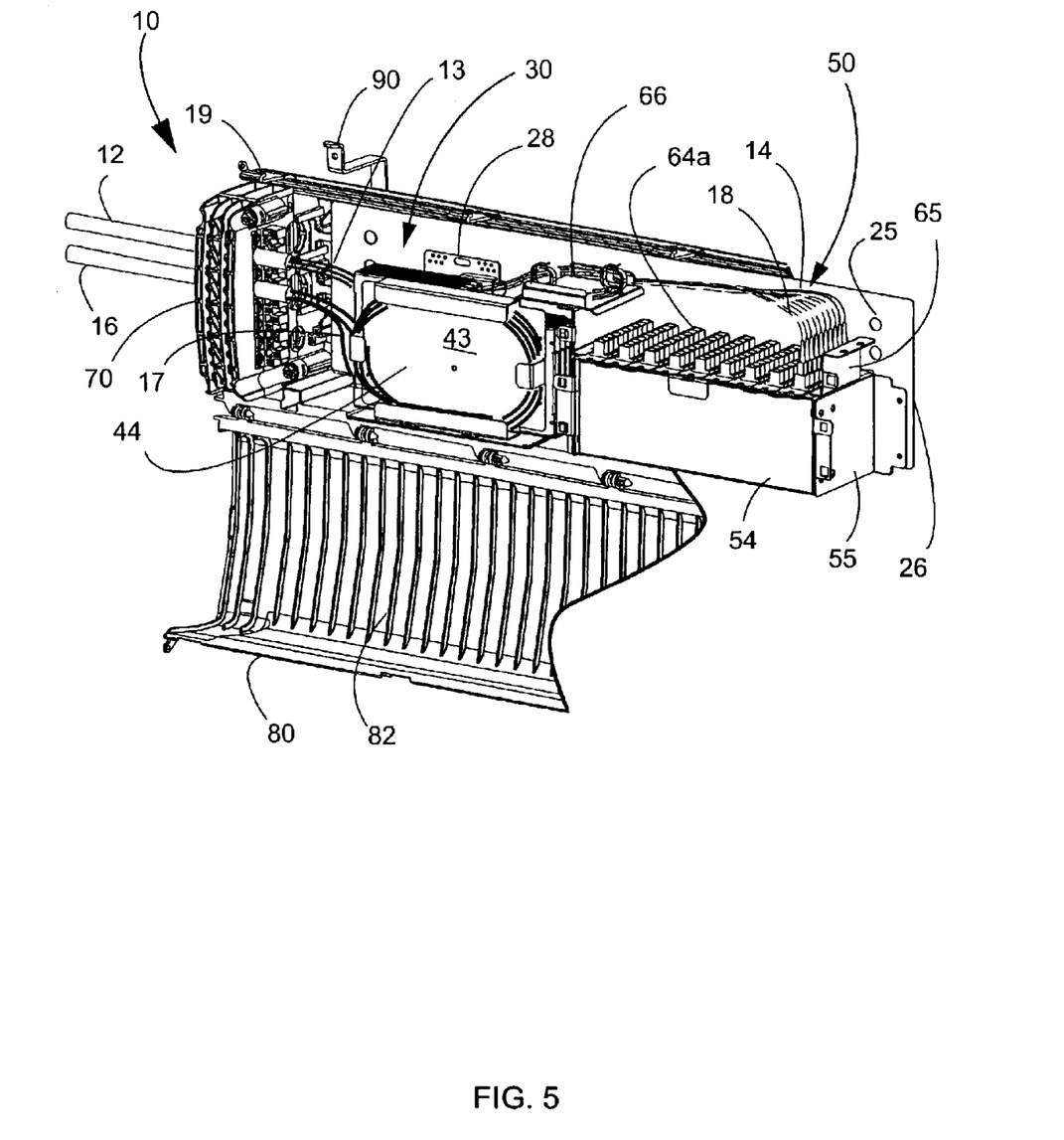
FIG. 5 is a perspective view of the interior compartment of the closure of FIG. 1 shown with the slack storage and splice tray assembly and the coupler module assembly fully assembled.

FIG. 4 is a perspective view of the interior compartment 21 of the closure 10 with the distribution fiber slack storage basket 44 and the distribution fiber splice trays 42 removed for purposes of clarity. Inside the splice tray 40, optical fibers from the buffer tube 13 are spliced one-to-one in a known manner to input optical fibers from feeder fiber pigtails 14. As shown in FIG. 4, the corresponding pigtails 14 are routed from the splice tray 40 to the pigtail slack storage basket 66 where coils of the slack lengths of the pigtails 14 are retained by the flanges 67 and guide rings 68 within the slack storage basket 66. The pigtails 14 are then routed from the slack storage basket 66 to a predetermined coupler module 64 housed within the coupler module housing 54. The connectorized ends of the pigtails 14 are optically connected to conventional adapters 64a provided on the coupler module 64.

FIG. 5 is a perspective view of the interior compartment of the closure 10 with the slack storage and splice tray assembly 32 and the coupler module assembly 52 fully assembled. Inside the coupler module 64, the optical fiber from each pigtail 14 is split in a known manner into two or more output optical fibers from distribution fiber pigtails 18 that carry different optical signals than the optical signal carried by the optical fiber from the pigtail 14. As shown in FIG. 5, the connectorized ends of the pigtails 18 are optically connected to adapters 64a provided on the coupler module 64. The pigtails 18 are routed from the coupler module 64 to the pigtail slack storage basket 66 where coils of the slack lengths of the pigtails 18 are retained by the flanges 67 and guide rings 68 within the slack storage basket 66. The pigtails 18 are then routed from the slack storage basket 66 to the distribution fiber splice trays 42. Inside the splice trays 42, output optical fibers from the pigtails 18 are spliced one-to-one in a known manner to optical fibers from the buffer tubes 17 of the distribution cable 16. The buffer tubes 17 of the distribution cable 16 are then routed from the splice trays 42 to the distribution fiber slack storage basket 44 where coils of the slack lengths of the buffer tubes 17 are retained by flanges 47 within the cavity 43 defined by the slack storage basket 44. Finally, the buffer tubes 17 are routed from the slack storage basket 44 in the fiber storage and fiber management area 30 to the distribution cable 16 positioned in the end cap 70.

FIG. 6 is an exploded perspective view of the closure 10 that illustrates the interconnection of a typical optical fiber of the buffer tube 13' of the feeder cable 12 with at least two typical optical fibers of the buffer tubes 17' of the distribution cable 16. As previously described, the buffer tube 13' is routed to the slack storage basket 34 and thereafter to the splice tray 40 where the optical fiber from the buffer tube 13' is spliced to the input optical fiber of the pigtail 14'. The pigtail 14' is then routed to the slack storage basket 66 and thereafter to the predetermined coupler module 64. The input optical fiber is split inside the coupler module into at least two output optical fibers of the pigtails 18'. The pigtails 18' are routed to the slack storage basket 66 and thereafter to the splice trays 42 where the output optical fibers of the pigtails 18' are spliced to optical fibers from the buffer tubes 17'. The buffer tubes 17' then exit the closure 10 through distribution cable 16. The configuration illustrated in FIG. 6 is typically utilized to permit a field technician to field terminate selected optical connections by interconnecting and mechanically splicing at least one input optical fiber of a pigtail 14' from buffer tube 13' of feeder cable 12 with two or more output optical fibers of pigtail 18' from buffer tubes 17' of distribution cable 16, for example drop cables or branch cables, through one or more coupler modules 64 provided within fiber coupling area 50 and one or more splice trays 40, 42 provided within fiber storage and fiber management area 30.

Figure 7:
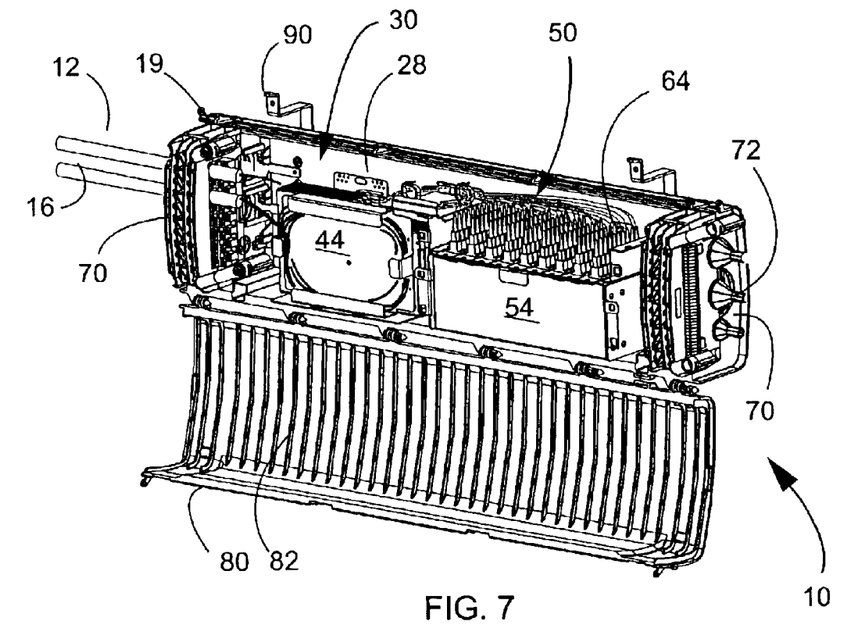
FIG. 7 is a perspective view of a first embodiment of the closure of FIG. 1 illustrating a left-hand cable installation.
Figure 8:
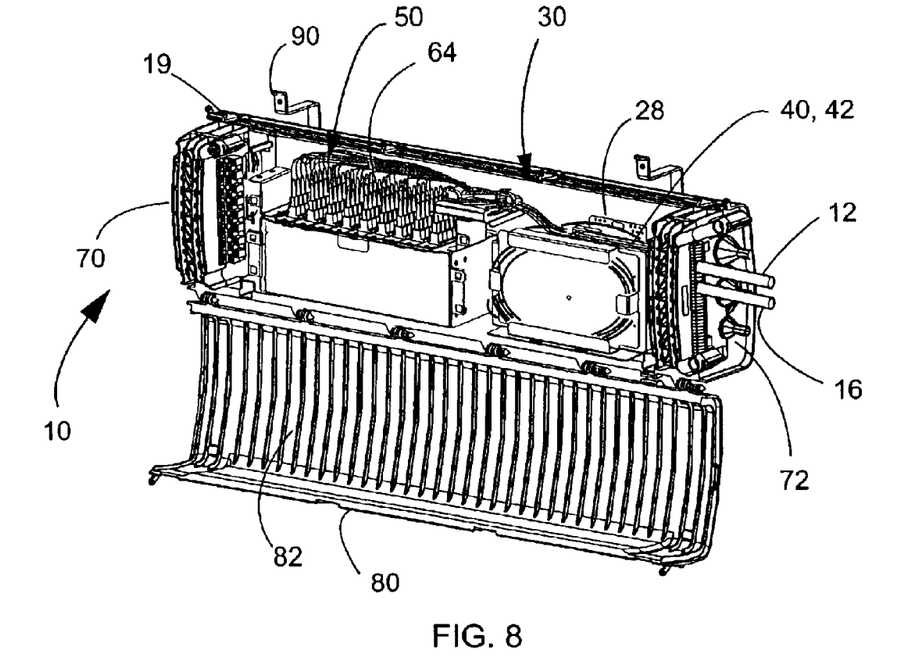
FIG. 8 is a perspective view of a second embodiment of the closure of FIG. 1 illustrating a right-hand cable installation.

FIG. 7 is a perspective view of a first embodiment of the closure 10 illustrating a left-hand cable installation. In particular, the feeder cable 12 and the distribution cable 16 pass through the end cap 70 on the left-hand side of the base 20. Accordingly, the back plate 26 is mounted within the interior compartment 21 such that the fiber storage and fiber management area 30 is on the left and the fiber coupling area 50 is on the right. FIG. 8 is a perspective view of a second embodiment of the closure 10 illustrating a right-hand cable installation. In particular, the feeder cable 12 and the distribution cable 16 pass through the end cap 70 on the right-hand side of the base 20. Accordingly, the back plate 26 is mounted within the interior compartment 21 (i.e., flipped over about the lateral axis) such that the fiber storage and fiber management area 30 is on the right and the fiber coupling area 50 is on the left. FIGS. 7 and 8 show the fiber storage and fiber management area 30 and the fiber coupling area 50 of a fully populated closure 10 wherein a total of 18 optical fibers from a single buffer tube 13 of the feeder cable 12 are spliced inside feeder fiber splice tray 40 to a corresponding total of 18 input optical fibers of pigtails 14. The 18 input optical fibers from pigtails 14 are then split by nine coupler modules 64 into a total of 72 output optical fibers of pigtails 18. The 72 output optical fibers from pigtails 18 are then spliced inside distribution fiber splice trays 42 to a corresponding total of 72 optical fibers of distribution cable 16. The configuration shown in FIGS. 7 and 8 is for illustration purposes only, and the closure 10 may be configured to have any convenient number of feeder cables 12, buffer tubes 13, splice trays 40, pigtails 14, coupler modules 64, pigtails 18, splice trays 42, buffer tubes 17, and distribution cables 16. Furthermore, the closure 10 may be configured initially with fewer than all of the splice trays 40, 42 and coupler modules 64, and additional splice trays 40, 42 and coupler modules 64 may be installed later as the remaining capacity of the closure 10 permits. Furthermore, the coupler modules 64 may be mounted in the coupler module housing 54 at a angle relative to the lengthwise direction defined by the base 20 so as to provide improved access to the optical fiber connections, or to provide increased capacity.

Figure 9:
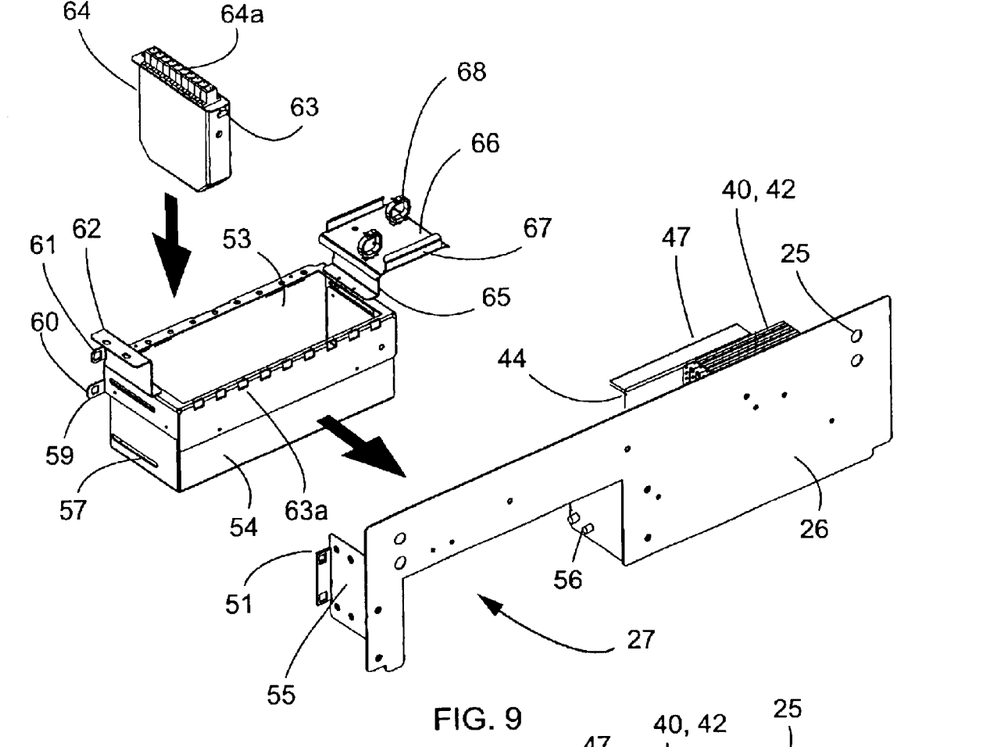
FIG. 9 is an exploded rear perspective view illustrating the installation of the coupler module assembly on the back plate.
Figure 10:
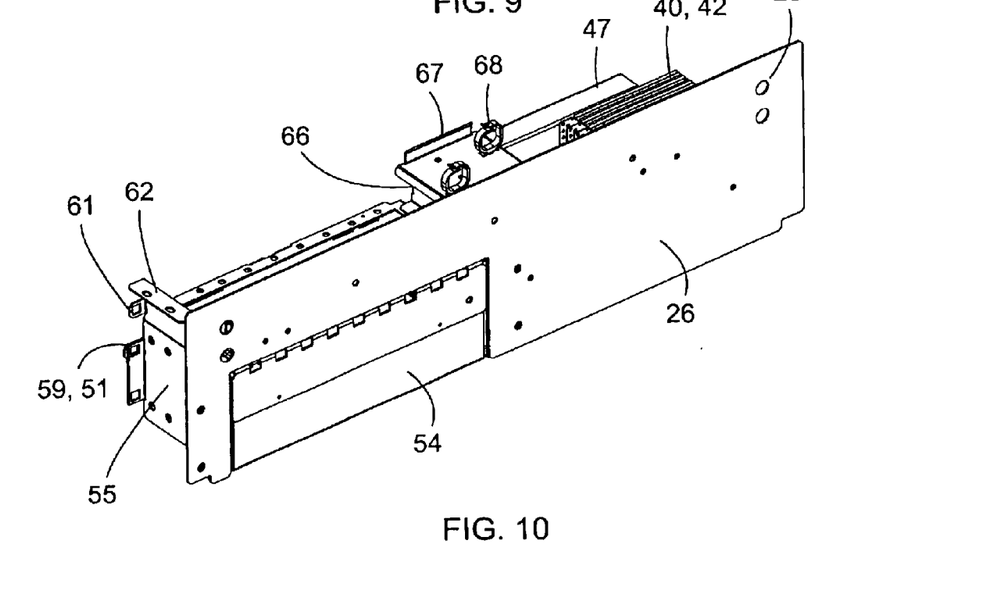
FIG. 10 is a rear perspective view showing the slack basket and splice tray assembly and the coupler module assembly fully installed on the back plate.

FIG. 9 is an exploded rear perspective view illustrating the installation of the coupler module assembly 52 on the back plate 26. FIG. 10 is a view from the same perspective showing the slack basket and splice tray assembly 32 and the coupler module assembly 52 fully installed on the back plate 26. The fiber coupling area 50 comprises a plurality of coupler modules 64 retained in a cavity 53 defined by the coupler module housing 54 that is attached to the base 20 by brackets 55. As shown, each coupler module 64 is oriented vertically relative to the base 20 (i.e., parallel to the lateral direction defined by the base 20) and parallel to the end caps 70. Each coupler module 64 is attached to the upper edge of the coupler module housing 54 such that the coupler module 64 extends inwardly into the cavity 53 defined by the coupler module housing 54. In the embodiments shown and described herein, a total of nine coupler modules 64 may be retained within the cavity 53 defined by the coupler module housing 54. Preferably, each of the coupler modules 64 is secured to the upper edge of the coupler module housing 54 by a hook 63 at one end and a latch plunger (not shown) at the opposite end. The upper edge of the coupler module housing 54 is provided with a complimentary opening 63a for receiving the hook 63 and a complimentary latch grommet (not shown) on the opposite side for receiving the latch plunger. The coupler module 64 is inserted into the cavity 53 defined by the coupler module housing 54 such that the hook 63 is received within the corresponding opening 63a formed in the upper edge of the coupler module housing 54 (FIG. 9).

The coupler module 64 is then moved in a direction generally perpendicular to both the lengthwise direction and the lateral direction defined by the base 20 away from the back plate 26 until the latch plunge overlies the latch grommet provided on the opposite side of the upper edge of the coupler module housing 54. The coupler module 64 is then moved in a direction generally perpendicular to the lengthwise direction and generally parallel to the lateral direction defined by the base 20 until the latch plunger engages the latch grommet. The coupler module 64 may be removed from the coupler module housing 54 by pulling the latch plunger upwardly and reversing the above steps.

As previously mentioned, each coupler module 64 divides, or splits, an optical signal carried on an input optical fiber of a feeder fiber pigtail 14 spliced to an optical fiber from a buffer tube 13 of feeder cable 12 into different optical signals carried on two or more output optical fibers of distribution fiber pigtails 18 spliced to buffer tubes 17 of distribution cable 16. Preferably, each coupler module 64 has a plurality of adapters 64a for receiving input optical fibers (i.e., pigtails 14) and output optical fibers (i.e., pigtails 18) having fiber optic connectors on at least one end. Thus, the input optical fibers and the output optical fibers are referred to herein as "pre-connectorized" or "connectorized." The adapters 64a may be staggered, or angled, or both, relative to the coupler module 64 to likewise provide improved access to the connectors or increased fiber capacity. As shown, each coupler module 64 comprises a total of ten adapters 64a for receiving connectorized optical fibers. As a result, each coupler module 64 has enough adapters 64a to split input optical fibers from a pair of pigtails 14 into two sets of output optical fibers from four pigtails 18 (i.e., a pair of 1×4 couplers). Alternatively, each couple module 64 may split one input optical fiber from a single pigtail 14 into output optical fibers from eight pigtails 18 (i.e., a single 1×8 coupler).

Preferably, the innermost two adapters 64a are available to receive input optical fibers from pigtails 14 spliced to buffer tube 13 of feeder cable 12, while the outermost eight adapters 64a are available to receive output optical fibers from pigtails 18 spliced to buffer tubes 17 of distribution cable 16. This configuration permits the optical fibers to be positioned in a predetermined sequence within the coupler modules 64. The closure 10 can be configured initially to comprise anywhere from one to nine coupler modules 64, and additional coupler modules 64 may be added later as the remaining capacity of the closure 10 permits. Thus, when fully populated with nine coupler modules 64 (as shown in FIGS. 7 and 8), the closure 10 permits up to 18 input optical fibers from pigtails 14 to be split into up to 72 output optical fibers from pigtails 18. As previously described, the 72 output optical fibers from pigtails 18 may be individual drop cables leading to homes or businesses, or may be branch cables leading to other closures 10 along the optical network, or may be both. The pigtails 14, 18 may be uncoated (i.e., bare) individual fibers, but preferably, are coated with a plastic sheath to protect the optical fibers from adverse environmental effects. Furthermore, the pigtails 14, 18 may be color-coded to permit ready identification. Preferably, each of the pigtails 14, 18 is about the same length for ease of manufacture and installation. Slack lengths of the pigtails 14, 18 are retained within the slack basket 66 so that the appropriate length of the pigtail 14, 18 may be routed to the fiber coupling area 50 and to the fiber storage and fiber management area 30, respectively.

The illustrative embodiments of the closure shown and described herein provide a number of significant advantages over previously known closures, such as conventional splice closures. For purposes of example only, and not by way of limitation, a closure constructed in accordance with the invention provides substantially greater capacity than a conventional splice closure as a result of the incorporation of coupler modules. Furthermore, a closure constructed in accordance with the invention provides substantially greater capacity as a result of the efficient use of the space available within the closure for the fiber storage, fiber management, and fiber coupling components. Still further, a closure constructed in accordance with the invention provides a field technician with substantially greater ease and flexibility in re-configuring the optical fiber connections within the closure. Still further, a closure constructed in accordance with the invention permits an optical fiber from a feeder cable to be interconnected with two or more optical fibers of a distribution cable. In an alternative embodiment, one or more of the splice trays may be removed from the closure to permit a technician to field terminate at least one pre-connectorized optical fiber from a feeder cable with two or more pre-connectorized optical fibers from a distribution cable, or with two or more optical fibers from a distribution cable through at least one mechanical splice tray.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. A closure for interconnecting at least one optical fiber of a feeder cable with two or more optical fibers of a distribution cable, the closure comprising:
   a base defining a lengthwise direction and a lateral direction;
   at least one end cap attached to the base, the end cap having at least one opening therethrough for receiving the feeder cable and at least one opening therethrough for receiving the distribution cable;
   a fiber storage and fiber management area for storing slack lengths of the optical fiber of the feeder cable and slack lengths of the optical fibers of the distribution cable and for splicing the optical fiber of the feeder cable and the optical fibers of the distribution cable to optical fiber pigtails; and
   a fiber coupling area for splitting an optical signal carried by the optical fiber pigtail spliced to the optical fiber of the feeder cable into two or more optical signals carried by the optical fiber pigtails spliced to the optical fibers of the distribution cable.

2. A closure according to claim 1 wherein the fiber coupling area comprises a plurality of coupler modules removably attached to a coupler module housing.

3. A closure according to claim 2 wherein the optical fiber pigtails are connectorized and wherein each of the coupler modules comprises a plurality of adapters for receiving the connectorized optical fiber pigtails.

4. A closure according to claim 2 wherein the coupler module housing defines a cavity and each of the coupler modules is retained within the cavity such that the coupler module is perpendicular to the lengthwise direction defined by the base.

5. A closure according to claim 2 wherein each of the coupler modules comprises a hook that is received within an opening formed in the coupler module housing to removably attach the coupler module to the coupler module housing.

6. A closure according to claim 1 wherein the fiber storage and fiber management area comprises at least one slack storage basket and at least one splice tray.

7. A closure according to claim 6 wherein the at least one slack storage basket comprises a feeder fiber slack storage basket for retaining slack lengths of the optical fiber of the feeder cable and a distribution fiber slack storage basket for retaining slack lengths of the optical fibers of the distribution cable.

8. A closure according to claim 7 wherein the splice tray is positioned between the feeder fiber slack storage basket and the distribution fiber slack storage basket.

9. A closure according to claim 7 further comprising a back plate secured to the base and wherein the feeder fiber slack storage basket is secured to the back plate, the splice tray is positioned outwardly of the feeder fiber slack storage basket, and the distribution fiber slack storage basket is positioned outwardly of the splice tray.

10. A closure according to claim 7 wherein each of the feeder fiber slack storage basket and the distribution fiber slack storage basket comprise at least one flange for retaining the slack lengths of the optical fiber of the feeder cable and the slack lengths of the optical fibers of the distribution cable.

11. A closure according to claim 1 wherein the fiber storage and fiber management area is located adjacent the end cap and the fiber coupling area is located adjacent the fiber storage and fiber management area in the lengthwise direction defined by the base.

12. A closure according to claim 1 wherein the fiber storage and fiber management area comprises a feeder fiber splice tray for splicing the optical fiber of the feeder cable to one of the optical fiber pigtails and at least one distribution fiber splice tray for splicing the optical fibers of the distribution cable to others of the optical fiber pigtails.

13. A closure for interconnecting an input optical fiber with a plurality of output optical fibers, the closure comprising:
a base defining a lengthwise direction and a lateral direction;
at least one end cap attached to the base, the end cap having at least one opening therethrough for receiving the input fiber and at least one opening therethrough for receiving the output fibers;
a back plate secured to the base and having opposed ends in the lengthwise direction;
a fiber storage and fiber management area adjacent one of the opposed ends of the back plate for storing slack lengths of the input optical fiber and slack lengths of the output optical fibers;
a fiber coupling area adjacent the other opposed end of the back plate for splitting an optical signal carried by the input optical fiber into a plurality of optical signals carried by the output optical fiber, the fiber coupling area comprising a plurality of coupler modules removably attached to a coupler module housing;
wherein the input optical fiber and the output optical fibers are connectorized; and
wherein each of the coupler modules comprises a plurality of adapters for receiving the connectorized input optical fiber and the connectorized output optical fibers.

14. A closure according to claim 13 wherein the coupler module housing defines a cavity and each of the coupler modules is retained within the cavity such that the coupler module is perpendicular to the lengthwise direction defined by the base.

15. A closure according to claim 13 wherein the fiber storage and fiber management area comprises at least one slack storage basket.

16. A closure according to claim 15 wherein the at least one slack storage basket comprises a feeder fiber slack storage basket for retaining slack lengths of the input optical fiber and a distribution fiber slack storage basket for retaining slack lengths of the output optical fibers.

17. A closure according to claim 16 wherein the feeder fiber slack storage basket is secured to the back plate and positioned outwardly therefrom and the distribution fiber slack storage basket is positioned outwardly of the feeder fiber slack storage basket.

18. A closure according to claim 16 wherein each of the feeder fiber slack storage basket and the distribution fiber slack storage basket comprise at least one flange for retaining the slack lengths of the input optical fiber and the slack lengths of the output optical fibers.

19. A closure according to claim 13 wherein the fiber storage and fiber management area is located adjacent the end cap and the fiber coupling area is located adjacent the fiber storage an fiber management area in the lengthwise direction defined by the base.

20. A closure according to claim 13 wherein the fiber storage and fiber management area comprises at least one splice tray for splicing the input optical fiber and the output optical fibers to a plurality of optical fiber pigtails.

21. A closure for interconnecting an input optical fiber with a plurality of output optical fibers, the closure comprising:
a base defining a lengthwise direction and a lateral direction;
at least one end cap attached to the base, the end cap having at least one opening therethrough for receiving the input fiber and at least one opening therethrough for receiving the output fibers;
a back plate secured to the base and having opposed ends in the lengthwise direction;
a fiber storage and fiber management area adjacent one of the opposed ends of the back plate for storing slack lengths of the input optical fiber and slack lengths of the output optical fibers;
a fiber coupling area adjacent the other opposed end of the back plate for splitting an optical signal carried by the input optical fiber into a plurality of optical signals carried by the output optical fiber, the fiber coupling area comprising a plurality of coupler modules removably attached to a coupler module housing;
wherein each of the coupler modules comprises a hook that is received within an opening formed in the coupler module housing to removably attach the coupler module to the coupler module housing.

22. A closure for interconnecting an input optical fiber with a plurality of output optical fibers, the closure comprising:
a base defining a lengthwise direction and a lateral direction;
at least one end cap attached to the base, the end cap having at least one opening therethrough for receiving the input fiber and at least one opening therethrough for receiving the output fibers;

a back plate secured to the base and having opposed ends in the lengthwise direction;

a fiber storage and fiber management area adjacent one of the opposed ends of the back plate for storing slack lengths of the input optical fiber and slack lengths of the output optical fibers;

a fiber coupling area adjacent the other opposed end of the back plate for splitting an optical signal carried by the input optical fiber into a plurality of optical signals carried by the output optical fiber;

wherein the input optical fiber is a pre-connectorized feeder cable and the output optical fibers are pre-connectorized drop cables.

* * * * *